United States Patent [19]
Zaitzeva et al.

[11] Patent Number: 5,781,924
[45] Date of Patent: Jul. 14, 1998

[54] COMPUTER CACHING METHODS AND APPARATUS

[75] Inventors: Zinaida Nikolaevna Zaitzeva; Oleg Alexandrovich Konopleff; Michael Victorovich Laptev; Andrey Alexe'evich Vechtomov, all of Moscow, Russian Federation

[73] Assignee: Sun Microsystems, Inc., Palo Alto, Calif.

[21] Appl. No.: 813,735

[22] Filed: Mar. 7, 1997

Related U.S. Application Data

[63] Continuation of PCT/RU96/0282, Sep. 30, 1996.

[51] Int. Cl.[6] .................................................... G06F 12/00
[52] U.S. Cl. ........................................... 711/131; 711/133
[58] Field of Search ................................. 711/131, 133

[56] References Cited

U.S. PATENT DOCUMENTS

| | | | |
|---|---|---|---|
| 4,458,310 | 7/1984 | Chang | 711/119 |
| 5,228,135 | 7/1993 | Ikumi | 711/131 |
| 5,247,634 | 9/1993 | Cline et al. | 707/205 |
| 5,247,649 | 9/1993 | Bandoh | 711/130 |
| 5,325,504 | 6/1994 | Tipley et al. | 711/128 |
| 5,325,511 | 6/1994 | Collins et al. | 711/128 |
| 5,353,425 | 10/1994 | Malamy et al. | 711/144 |
| 5,355,478 | 10/1994 | Brady et al. | 707/7 |
| 5,390,318 | 2/1995 | Ramakrishnan et al. | 711/158 |
| 5,442,770 | 8/1995 | Barratt | 711/3 |
| 5,465,344 | 11/1995 | Hirai et al. | 711/131 |
| 5,530,884 | 6/1996 | Sprague et al. | 395/386 |
| 5,594,886 | 1/1997 | Smith et al. | 711/136 |
| 5,669,001 | 9/1997 | Moreno | 395/706 |
| 5,687,319 | 11/1997 | Cook et al. | 395/311 |
| 5,696,936 | 12/1997 | Church et al. | 711/138 |

OTHER PUBLICATIONS

Catanzaro, B., "Multiprocessor System Architectures" (Sun Microsystems, Inc., SunSoft Press, 1994), p. 96.
Bacon, David F., "Cache Advantage", *Byte*, Aug. 1994, pp. 79, 81–82, 84, 86.
Smith, Alan Jay, "Cache Memories", *ACM Computing Surveys*, vol. 14, No. 3, Sep. 1982, pp. 473–530.

*Primary Examiner*—Tod R. Swann
*Assistant Examiner*—Felix B. Lee
*Attorney, Agent, or Firm*—Skjerven, Morrill, MacPherson Franklin & Friel; Michael Shenker

[57] ABSTRACT

When cache misses occur simultaneously on two or more ports of a multi-port cache, different replacement sets are selected for different ports. The replacements are performed simultaneously through different write ports. In some embodiments, every set has its own write ports. The tag memory of every set has its own write port. In addition, the tag memory of every set has several read ports, one read port for every port of the cache. For every cache entry, a tree data structure is provided to implement a tree replacement policy (for example, a tree LRU replacement policy). If only one cache miss occurred, the search for the replacement set is started from the root of the tree. If multiple cache misses occurred simultaneously, the search starts at a tree level that has at least as many nodes as the number of cache misses. For each cache miss, a separate node is selected at that tree level, and the search for the respective replacement set starts at the selected node.

13 Claims, 10 Drawing Sheets

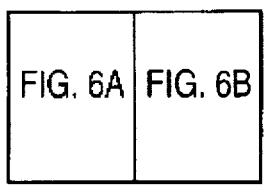
FIG. 6
FIG. 6A
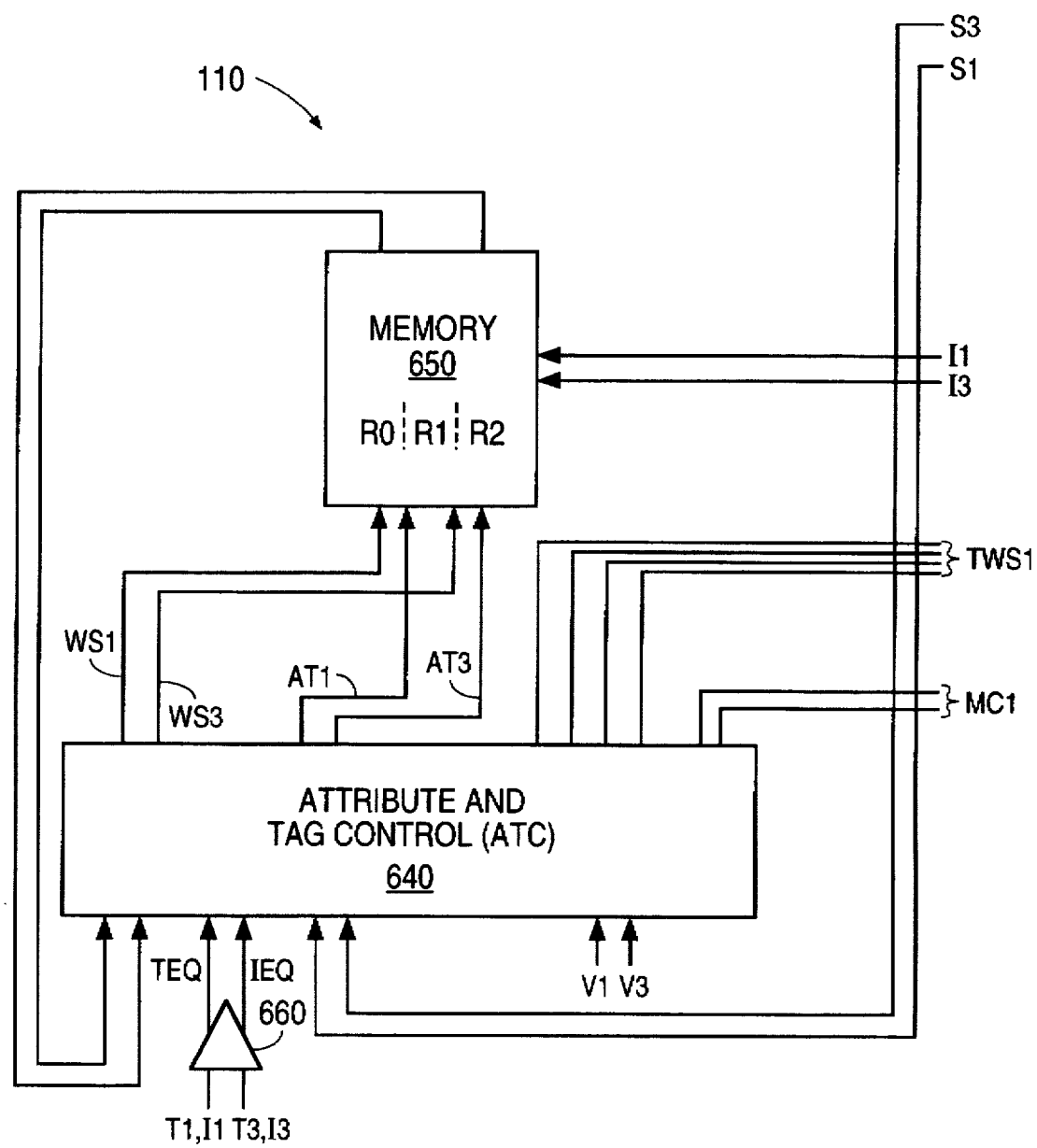

COMPUTER CACHING METHODS AND APPARATUS

CROSS-REFERENCE TO RELATED APPLICATIONS

The present application is a continuation of the PCT application PCT/RU96/0282 designating the United States, filed Sep. 30, 1996.

BACKGROUND OF THE INVENTION

The present invention relates to computers, and more particularly to cache memories in computer systems.

Present computer systems use multi-port caches to provide appropriate data flow to execution units of processors that implement instruction level parallelism or to multiple processors. It is desirable to provide faster economical multi-port caches.

SUMMARY

The present invention provides fast economical multi-port caches in some embodiments. In some embodiments, the cache is set associative. If cache misses occur on more than one port simultaneously, different replacement sets are chosen for different cache misses. A separate write port is provided for each set. Therefore, multiple replacements can proceed in parallel. In non-blocking cache embodiments, the performance of a processor or processors using the cache is therefore increased.

Since each set has its own write port, the set does not need multiple write ports to allow simultaneous access for different cache misses. The cache cost is therefore reduced.

In some embodiments, the sets are divided into groups of sets. A separate write port (i.e., address decoder) is provided for each group of sets. A separate write strobe is provided for each set. If simultaneous cache misses occur, replacement sets are selected from different groups. The replacement sets are updated in parallel. Each group of sets does not need multiple write ports to allow simultaneous access for different cache misses. The cache cost is therefore reduced.

In some embodiments, for each cache entry, a tree data structure is provided to implement a tree replacement policy. If only one cache miss occurred, the search for the replacement sets starts at the root of the tree. If multiple misses occurred simultaneously, the search starts at a tree level that has at least as many nodes as there were cache misses. For each cache miss, a separate node is selected at that level; the search for the respective replacement set starts with the selected node.

BRIEF DESCRIPTION OF THE DRAWINGS

FIGS. 6, 6A and 6B are block diagrams of a portion of the cache of FIG. 5.

DESCRIPTION OF PREFERRED EMBODIMENTS

Figure 1:
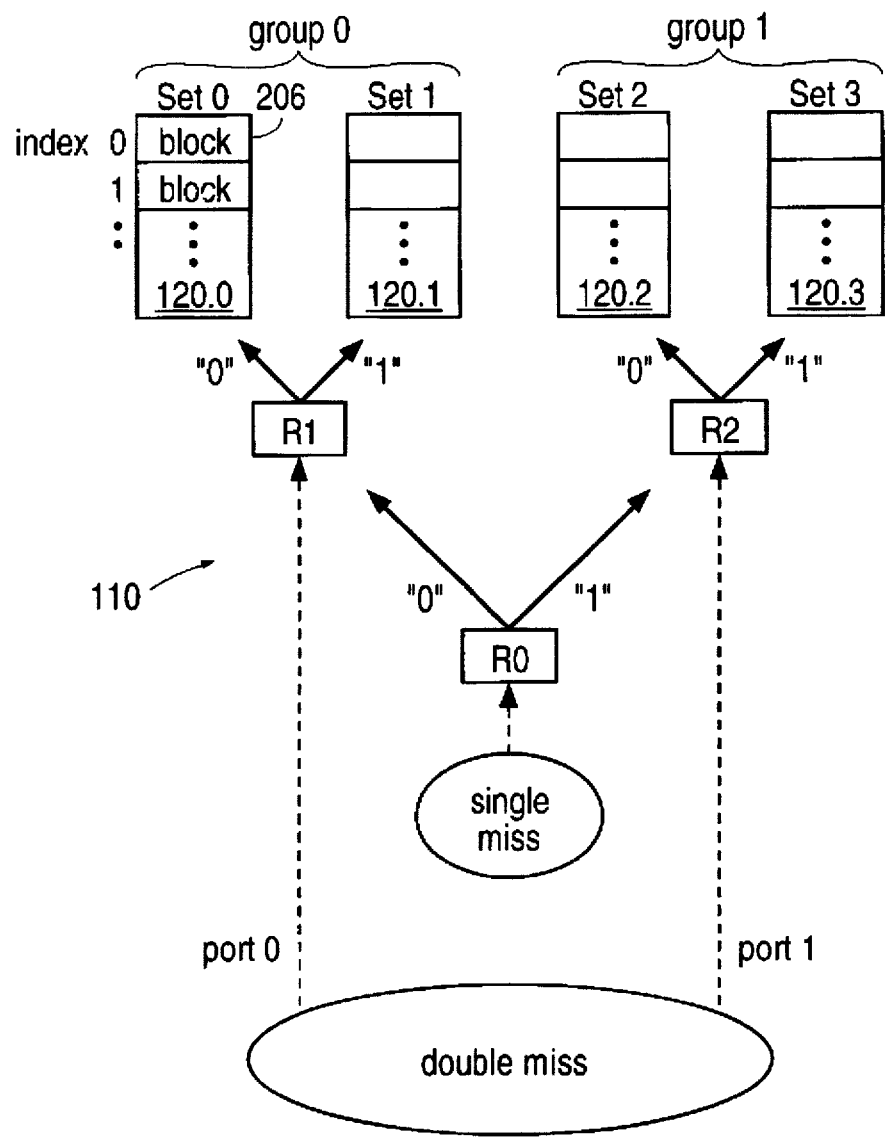
FIG. 1 is a block diagram illustrating a dual-port cache and a cache replacement policy according to the present invention.
Figure 2:
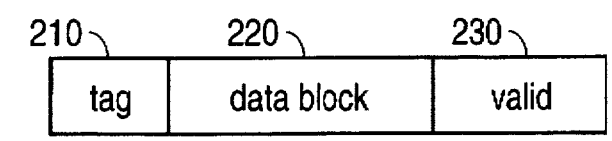
FIG. 2 is a diagram of a cache block in the cache of FIG. 1.

FIG. 1 illustrates a double-ported four-way set-associative non-blocking cache 110. Cache 110 has four sets 0 through 3, also labeled 120.0 through 120.3. Each set includes a number of blocks 206 (128 blocks in some embodiments). As shown in FIG. 2, each block 206 includes a tag 210, a data block 220, and valid bits 230.

Figure 3:
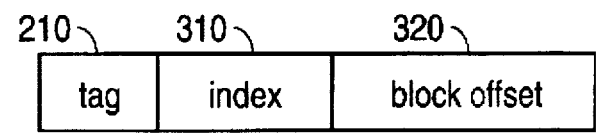
FIG. 3 is a diagram of an external memory address of data in the block of FIG. 2.

Data from external memory are placed in cache 110 as follows. The external memory address 304 (FIG. 3) of the data is subdivided into three fields 210, 310 and 320. Tag field 210 is stored in block 206. Index 310 determines the address of block 206 in a set 120.i. The data can be cached in any set 120.i at the slot corresponding to index 310. Index 310 is also called an entry number.

Field 320 determines the offset of the data in data block 220.

All cache blocks 206 having a given entry number form a "cache entry".

Cache 110 has two ports and thus is suitable for use in a processor that has two or more channels for memory access. Examples of such processors are 1) very large instruction word (VLIW) processors and 2) superscalar processors. Cache 110 is also suitable for multi-processor systems including single channel and/or multiple channel processors.

Cache 110 includes memory that stores bits R0, R1, R2 to implement a tree replacement policy. A separate triple R0, R1, R2 is provided for each cache entry. For each entry, bits R0, R1, R2 implement a tree structure. R1 and R2 are leaf nodes of the tree. The leaf R1 selects set 0 or set 1 as a replacement set. More particularly, R1=0 selects set 0; R1=1 selects set 1. For each cache entry, R1 selects the LRU (least recently used) of sets 0 and 1, that is, R1 selects the LRU of the two cache blocks in the respective entry in sets 0 and 1.

Similarly, R2=0 selects set 2, and R2=1 selects set 3. R2 selects the LRU of sets 2 and 3.

R0=0 selects the group of sets 0, 1 (group 0). R0=1 selects the group of sets 2, 3 (group 1). For each cache entry, R0 selects the LRU of groups 0, 1. This replacement policy is called herein "tree-LRU".

If a cache miss occurs on one, but not both, of ports 0 and 1, a replacement set is selected as follows. The cache entry is determined from index 310 of the cache-miss address 304. For this cache entry, bits R0, R1, R2 are examined. If bit R0 selects group 0, then the replacement set is selected by bit R1. If R0 selects group 1, the replacement set is selected by bit R2.

If a cache miss occurs on both ports 0 and 1 simultaneously (on the same clock cycle), then different groups of replacement sets are selected for different ports. The replacement set for port 0 is selected by bit R1 for the cache entry corresponding to index 310 on port 0. The replacement set for port 1 is selected by bit R2 for the index 310 on port 1. Bits R0 are ignored. Selection of different sets facilitates simultaneous writing of new information into the replacement sets. In particular, a single write port for each set is sufficient to write the information simultaneously. Moreover, even a single write port address decoder for each of groups 0 and 1 is sufficient.

Figure 4:
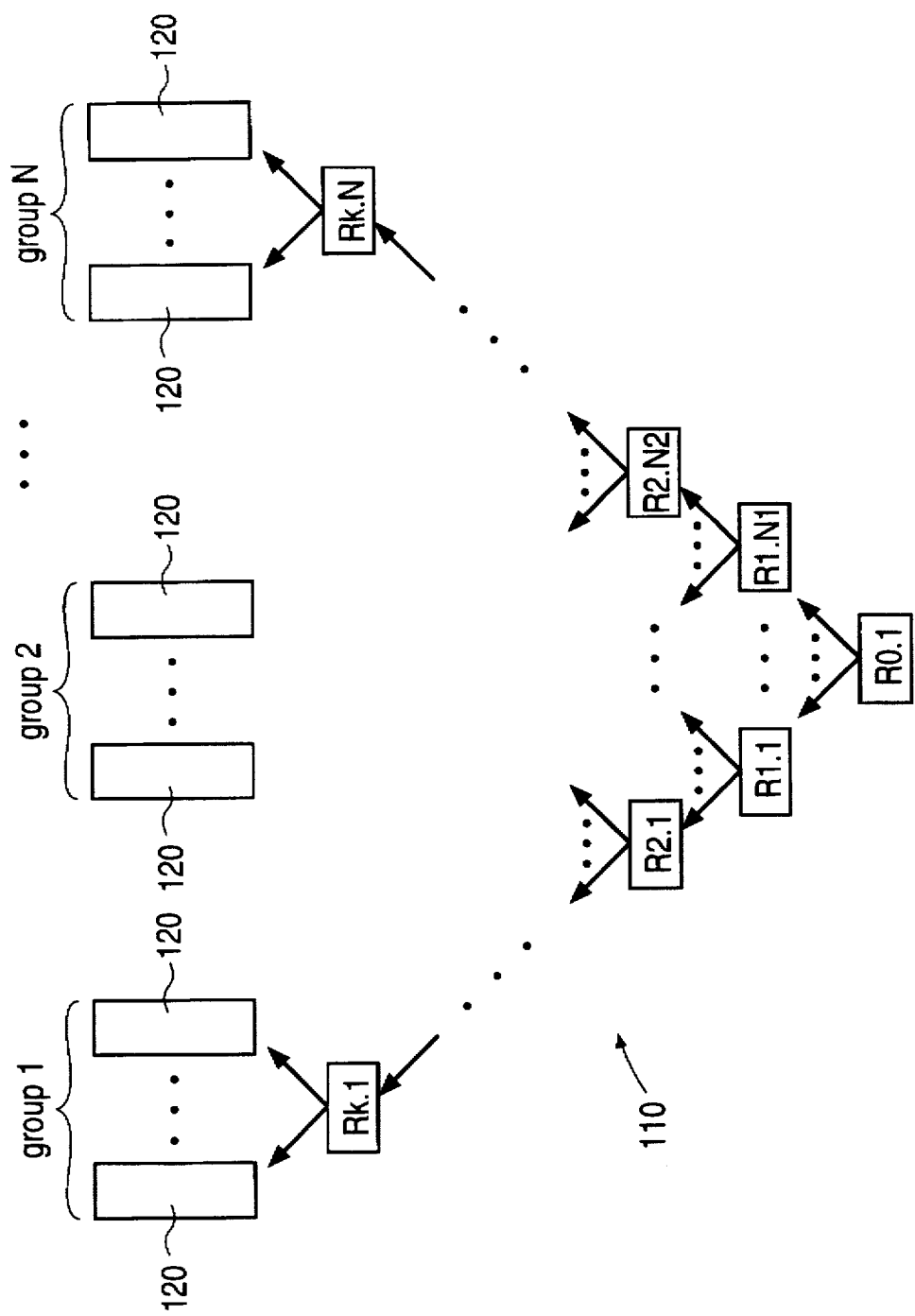
FIG. 4 is a block diagram of another cache of the present invention.

FIG. 4 illustrates a cache 110 in which different replacement sets are selected for up to N cache misses. Hence, simultaneous replacements are provided for up to N cache ports. N can be any integer greater than 1. The sets are divided into N groups. The replacement sets are selected using a tree replacement policy. More particularly, the cache includes trees of data structures Ri.j, i=0, ..., k; j=1, N1, ..., Nk=N. A separate tree is provided for each cache entry. If a single cache miss occurs, the search for the replacement set starts with the root data structure R0.1. The search is performed in the tree corresponding to the cache miss index 310. The root structure R0.1 selects one of the structures R1.1 through R1.N1 at the next tree level. Each data structure R1.i selects one of structures R2.1 through R2.N2 at the following tree level, and so on. Each leaf Rk.1 through Rk.N selects a replacement set in the corresponding group 1 through N. The tree search proceeds from the root to the leaves in a conventional manner.

If the number M of cache misses occurring in a given clock cycle is greater than 1 but does not exceed N1, M tree nodes are selected from nodes R1.1 through R1.N1. For each cache miss, the selected node is in the tree corresponding to the cache entry in which the replacement is to be made. Different selected nodes R1.j have different "j" parameters. M searches occur in parallel starting with the selected nodes. Each search proceeds conventionally in the subtree in which the selected node is the root. Each search results in a separate replacement set.

If the number M of simultaneous cache misses is greater than N1 but does not exceed N2, then M nodes are selected from the nodes R2.1 through R2.N2, and so on. The tree searches for M replacement sets start with the selected nodes.

If the number of simultaneous cache misses is greater than $N_{k-1}$ (the number of immediate parents of the leaf nodes), the searches start with the leaf nodes.

Writing to the replacement sets can be done in parallel if each set has a separate write port. Writing can be done in parallel even if a single write port address decoder is provided for each group 1 through N.

In some embodiments, cache 110 of FIG. 4 uses a tree-LRU replacement policy. More particularly, for each cache entry CE, each leaf node Rk.i selects the LRU set in the corresponding group of sets. In other words, each leaf node selects a set having the LRU data block in the corresponding entry in the corresponding group of sets. Each non-leaf node NLN selects an LRU group of sets and hence an LRU group of data blocks. More particularly, each immediate child of non-leaf node NLN is a root of a subtree. (The subtree may contain only one node if the child is a leaf.) All the leaf nodes of the subtree define a group G of the sets which are all the sets of all the groups corresponding to the leaves of the subtree. We will say that the group G corresponds to the root of the subtree. Thus, each child corresponds to a group of sets and hence to a group of blocks in cache entry CE. The non-leaf node NLN selects one of its immediate child nodes and hence selects one of the groups of blocks. The selected group of blocks is the LRU group of blocks.

Figure 5:
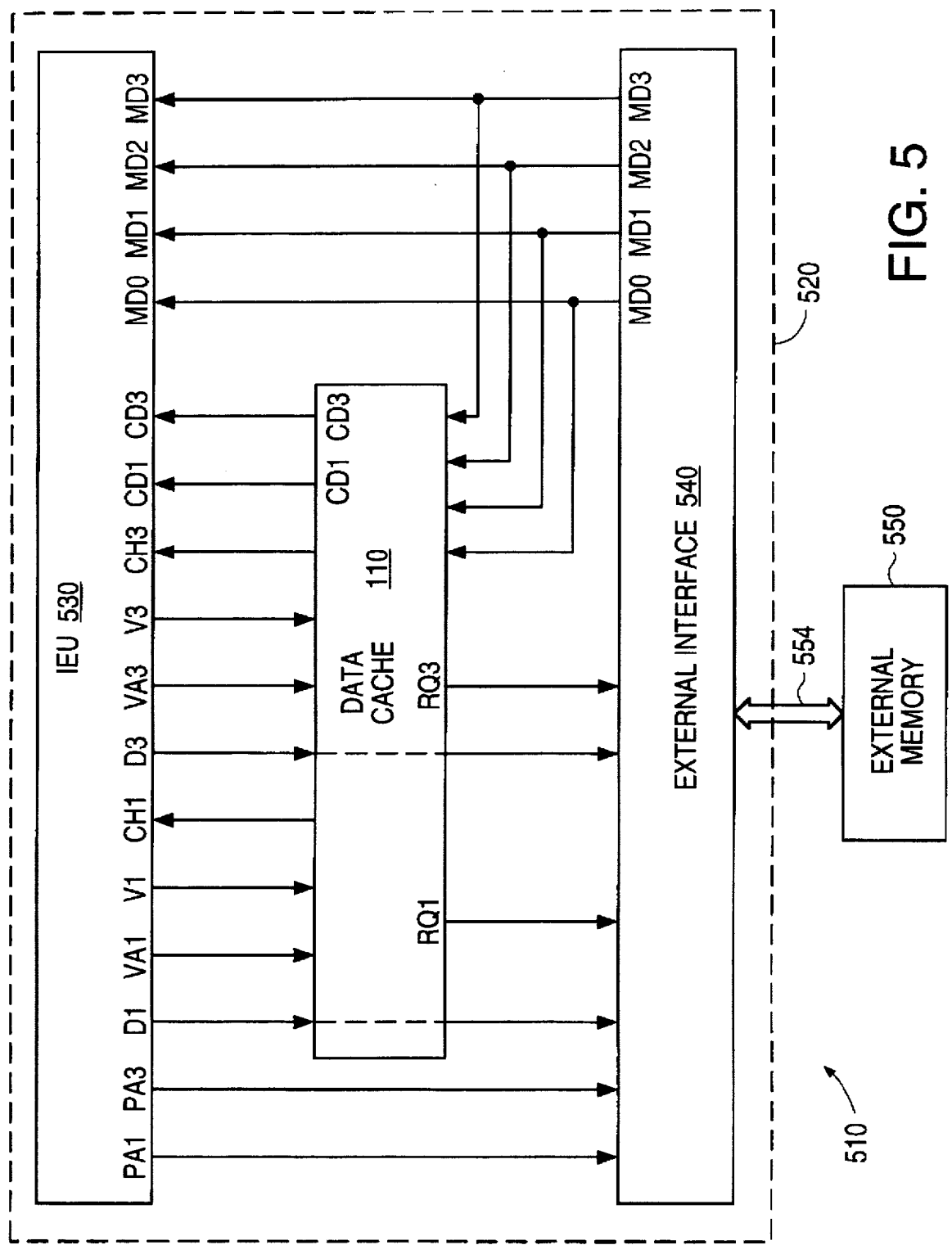
FIG. 5 is a block diagram of a computer system including a cache of the present invention.

FIG. 5 is a block diagram of a computer system 510 incorporating one embodiment of cache 110. Cache 110 is a write-through data cache ("DCACHE") internal to a VLIW RISC processor 520. Processor 520 is shown also in FIG. 10 and described in the Appendix. Processor 520 includes instruction execution unit (IEU) 530. IEU 530 includes four ALUs (arithmetic logic units) ALU0 through ALU3. The four ALUs provide four parallel execution channels 0 through 3 for arithmetic and logic operations. IEU 530 includes four Array Access Channels AAC0–AAC3 to generate array element addresses for loops. AAC0 and AAC2 are used only for memory load operations (operations that load data from external memory 550). AAC1 and AAC3 are used both for load and store operations.

In addition to arithmetic and logic operations, ALU1 and ALU3 are used to calculate addresses for scalar memory accesses.

Accordingly, IEU 530 has four channels 0 through 3 for communication with external memory 550 through external interface 540. Channels 1 and 3 are used both for reading and writing the memory. These channels go through cache 110. Channels 0 and 2 are used for reading only. These channels do not go through cache 110.

In IEU 530, channel 1 includes cache-hit input CH1, address-valid output V1, virtual-address output VA1, physical-address output PA1, data output D1, and data input CD1. Channel 3 includes cache-hit input CH3, address-valid output V3, virtual-address output VA3, physical-address output PA3, data output D3, and data input CD3. Ports CH1, V1, VA1, D1, CD1, CH3, V3, VA3, D3, CD3 are connected to cache 110. Ports PA1, PA3 are connected to external interface 540. Data on outputs D1, D3 are written to cache 110. These data are also written to memory 550 through external interface 540 and bus 554.

Channels 0 and 2 are not shown in FIG. 5. In IEU 530, channel 0 includes address-valid output V0 and physical-address output PA0. Channel 2 includes address-valid output V2 and physical-address output PA2. Ports PA0, PA2, V0, V2 are connected to external interface 540.

Channels 0–3 can be accessed in parallel.

External interface 540 and external memory 550 are interconnected by bus 554. Bus 554 includes four bidirectional channels that can access memory 550 in parallel. To write data to memory 550, the four channels of bus 554 can be multiplexed onto any one or more of channels 1 or 3. In particular, each of the four channels of bus 554 can communicate with one of the channels 1 or 3.

Figure 9:
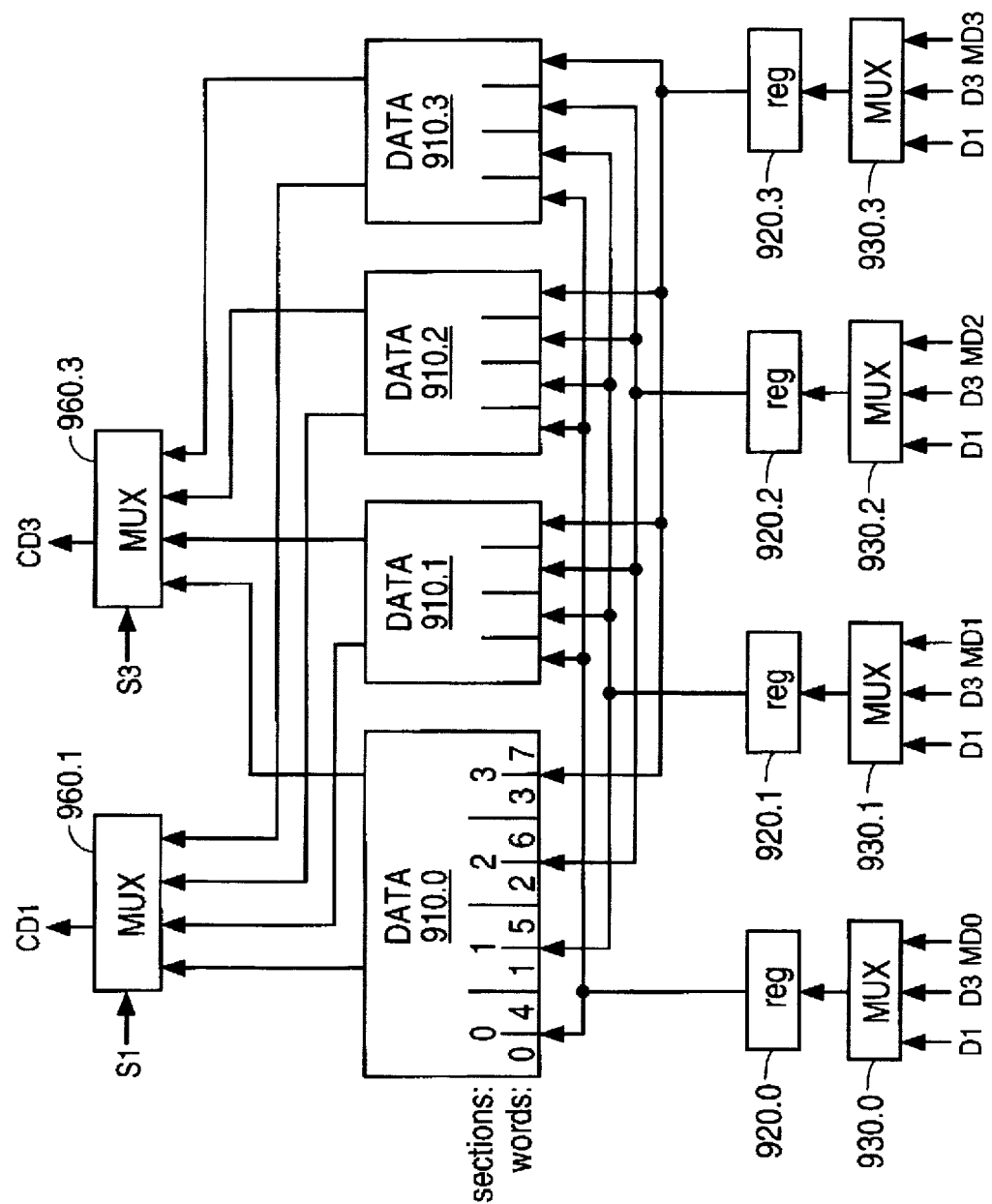

To read data from memory 550, CPU 520 has four parallel channels MD0 through MD3. Each channel MDi communicates with a respective one of the channels of bus 554. Channels MD0 through MD3 include outputs MD0 through MD3 in external interface 540. These outputs are connected to respective inputs MD0 through MD3 of IEU 530 and to respective inputs of cache 110. These inputs of cache 110 are illustrated in FIG. 9 as inputs of multiplexers 930.1 through 930.3.

Memory 550 includes a higher level cache in some embodiments.

Memory control logic external to processor 520 is not shown.

To read memory on channel 1 or 3, IEU 530 drives the memory virtual address on respective lines VA1 or VA3 and asserts the respective valid signal V1 or V3. If a cache hit occurs, cache 110 asserts respectively CH1 or CH3, and writes data to IEU 530 on respective lines CD1 or CD3. If a cache miss occurs, cache 110 asserts respective request signal RQ1 or RQ3 to external interface 540. IEU 530 provides the physical address on respective lines PA1 or PA3. In response, data from memory 550 are written to cache 110 and IEU 530 via one or more of the channels MD0–MD3.

Figure 6B:
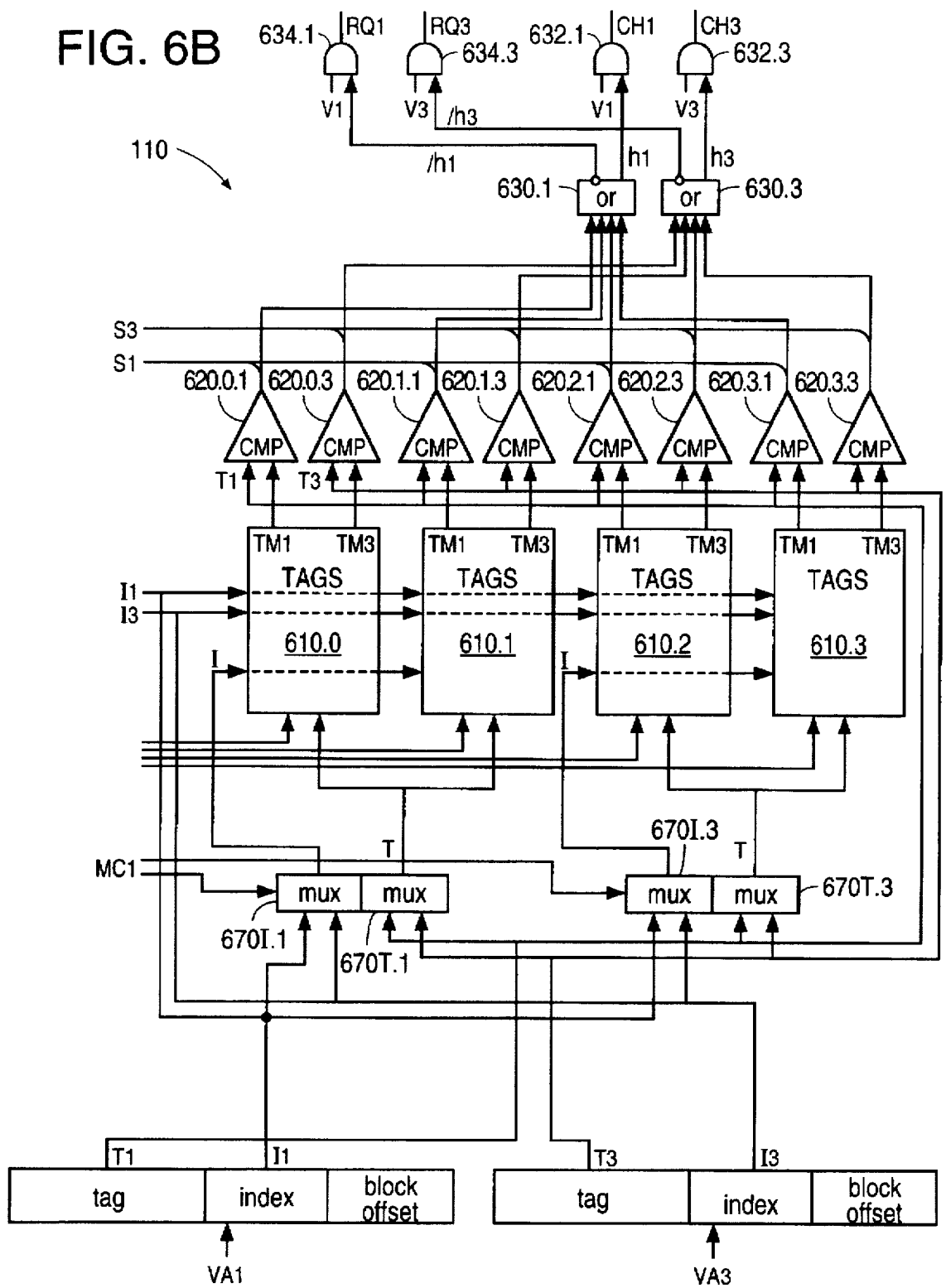

FIG. 6, which includes FIGS. 6A and 6B, is a diagram of a tag portion of cache 110. Cache 110 is a four-way set associative cache. Tag memories 610.0 through 610.3 (FIG.

6B) store tags 210 of respective sets 0 through 3. Each memory 610.i includes two read ports and one write port. The address input of one of the read ports receives index portion I1 of address VA1 from IEU 530. The address input of the other read port receives index I3 of address VA3.

The outputs TM1, TM3 of memory 610.0 are connected to inputs of respective comparators 620.0.1, 620.0.3. The other input of comparator 620.0.1 is connected to the tag portion T1 of address VA1. The other input of comparator 620.0.3 is connected to tag portion T3 of address VA3. Thus, the output signal of comparator 620.0.1 indicates whether T1 is equal to the tag at entry number I1 in memory 610.0. Similarly, the output of comparator 620.0.3 indicates whether the tag T3 is equal to the tag at entry number I3 in memory 610.0.

In the same manner, the outputs TM1, TM3 of each memory 610.i are connected to inputs of respective comparators 620.i.1, 620.i.3. The other inputs of the two comparators are connected respectively to T1, T3.

OR circuit 630.1 generates a signal h1. h1 is the OR of the outputs of comparators 620.i.1, i=0, 1, 2, 3. AND gate 632.1 generates CH1=h1 AND V1. V1 is the address-valid output of IEU 530. Signal CH1 indicates whether a cache hit occurred on channel 1. Signal CH1 is delivered to input CH1 of IEU 530.

Similarly, circuit 630.3 generates signal h3 which is the OR of the outputs of comparators 620.i.3; AND gate 632.3 generates CH3=h3 AND V3. Signal CH3 indicates whether a cache hit occurred on channel 3. Signal CH3 is delivered to input CH3 of IEU 530.

Circuits 630.1, 630.3 also generate respective signals /h1, /h3 which are the complements of respective signals h1, h3. "/" before a signal name indicates a complement. AND gate 634.1 generates RQ1=V1 AND /h1. AND gate 634.3 generates RQ3=V3 AND /h3.

Four-bit signal S1 is composed of the outputs of four comparators 620.i.1. S1 indicates: 1) whether a cache hit occurred on channel 1, and 2) if the hit occurred, in which set it occurred. Similarly, signal S3 composed of the outputs of four comparators 620.i.3 indicates: 1) whether a cache hit occurred on channel 3; and 2) if the hit occurred, in which set it occurred. Signals S1, S3 are delivered to attribute and tag control (ATC) circuit 640 (FIG. 6A).

Attribute memory 650 (FIG. 6A) stores three attribute bits R0, R1, R2 for each cache entry. Memory 650 has two read ports and two write ports. Indices I1, I3 are connected to address inputs of the respective read ports of memory 650. Indices I1, I3 are connected also to the address inputs of the respective write ports of memory 650.

When the tag memories 610.i are read, attribute memory 650 is also read on both read ports. The attributes provided by memory 650 are delivered to ATC circuit 640.

Comparator 660 compares the tag T1 with the tag T3 and the index I1 with the index I3. Comparator 660 generates: 1) signal TEQ indicating whether T1=T3; and 2) signal IEQ indicating whether I1=I3. Signals TEQ, IEQ are delivered to ATC circuit 640.

Circuit 640 receives also address-valid signals V1, V3 from IEU 530.

Write strobe output WS1 and attribute output AT1 of circuit 640 are connected to one write port of memory 650. Write strobe output WS3 and attribute output AT3 of circuit 640 are connected to the other write port of memory 650. When the write strobe outputs WS1 and/or WS3 are asserted, the attributes on the respective outputs AT1 and/or AT3 are written to memory 650 at addresses corresponding to respective indices I1 and/or I3.

Circuit 640 has four write strobe outputs TWS1 (FIG. 6A) connected to write strobe inputs of respective memories 610.0 through 610.3. Circuit 640 also has multiplexer control outputs MC1. One of the outputs MC1 is connected to select inputs of multiplexers 670I.1, 670T.1. The other one of outputs MC1 is connected to select inputs of multiplexers 670I.3, 670T.3. Two data inputs of multiplexer 670I.1 receive respective indices I1, I3. The output of multiplexer 670I.1 is connected to the address inputs of the write ports of memories 610.0, 610.1. Two data inputs of multiplexer 670I.3 receive respective indices I1, I3. The output of multiplexer 670I.3 is connected to the address inputs of the write ports of memories 610.2, 610.3.

Two data inputs of multiplexer 670T.1 receive respective tags T1, T3. The output of multiplexer 670T.1 is connected to the data inputs of the write ports of memories 610.0, 610.1. Two data inputs of multiplexer 670T.3 receive respective tags T1, T3. The output of multiplexer 670T.3 is connected to the data inputs of the write ports of memories 610.2, 610.3.

To write a tag into memory 610.0 or 610.1, circuit 640 causes multiplexer 670I.1 to select the address I1 or I3. Circuit 640 causes multiplexer 670T.1 to select the appropriate tag T1 or T3. Circuit 640 asserts a respective write strobe TWS1. Writing a tag into memory 610.2 or 610.3, is accomplished similarly via multiplexers 670L3, 670T.3. Writing to memory 610.0 or 610.1 can proceed in parallel with writing to memory 610.2 or 610.3.

In a memory access operation, if a cache miss occurred, the tag write operation is delayed from the respective tag read. In some embodiments, the tag write is performed one or more clock cycles later than the respective tag read; registers 950.1, 950.3 (FIG. 8) are used to delay the tag writes.

If a cache reload from external memory 550 is needed, the tags and the attributes are written immediately, before data arrive from memory 550. The data can arrive in parallel for channels 1 and 3.

Figure 7:
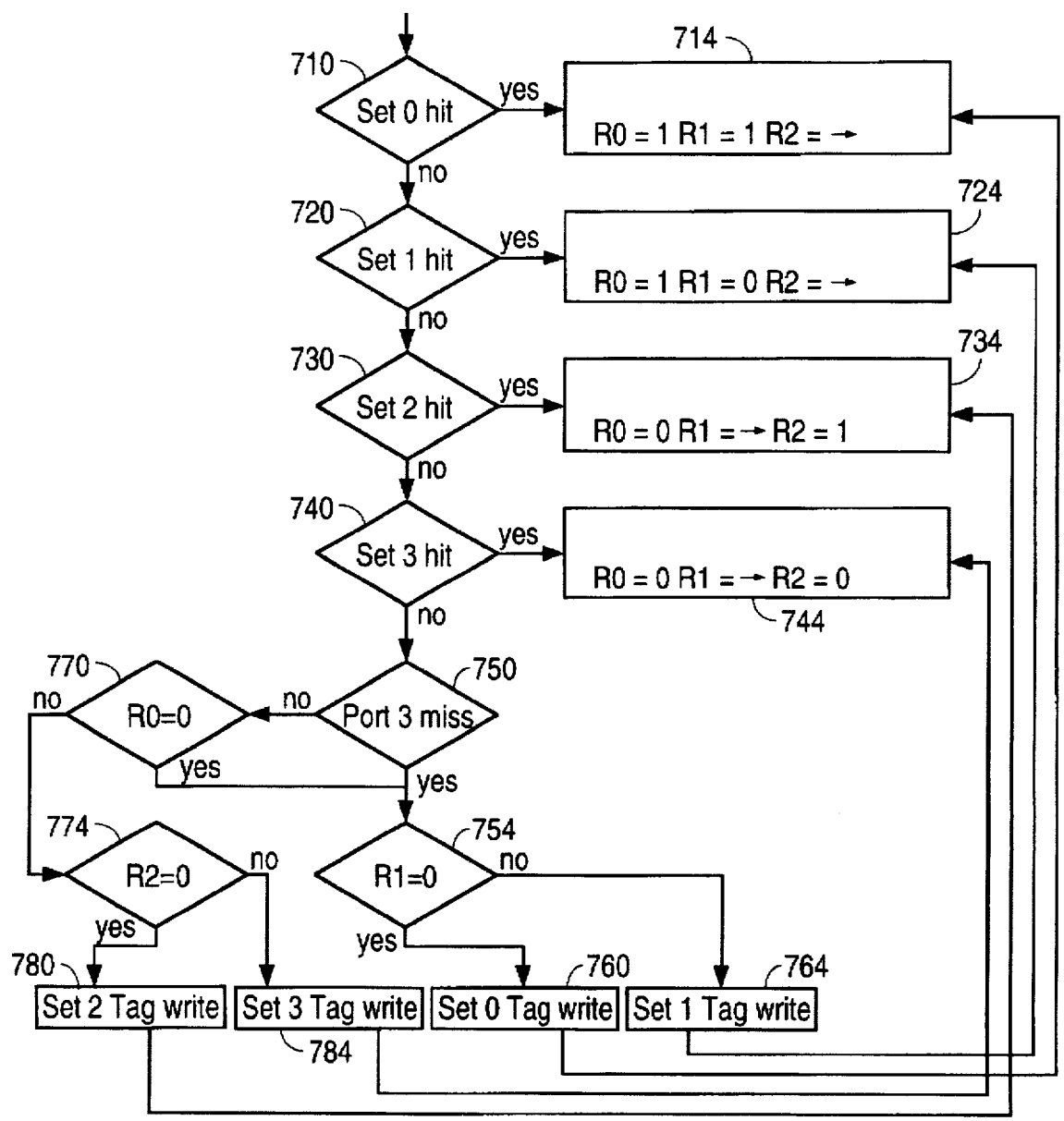
FIG. 7 is a block diagram of steps performed by the cache of FIG. 5.

Circuit 640 implements a tree-LRU replacement policy of FIG. 1. FIG. 7 illustrates operation of circuit 640 when: (a) V1 is asserted to indicate a memory access on channel 1; and (b) either V3 is deasserted (no access on channel 3), or V3 is asserted and the signal IEQ indicates that the indices I1, I3 do not coincide. FIG. 7 illustrates operations performed for the index I1. If V3 is asserted, similar operations are performed in parallel for the index I3.

As shown in FIG. 7, if the signal S1 indicates a set 0 hit on channel 1 (step 710), circuit 640 writes the attributes R0=1, R1=1, R2=--> to memory 650 at address I1 (step 714). "-->" means that R2 remains unchanged, that is, the new value of R2 is the old value read from memory 650.

Similarly, if signal S1 indicates a hit in set 1 (step 720), circuit 640 writes R0=1, R1=0, R2=--> (step 724).

If S1 indicates a hit in set 2 (step 730), circuit 640 writes R0=0, R1=-->, R2=1 (step 734). If S1 indicates a hit in set 3 (step 740), circuit 640 writes R0=0, R1=-->, R2=0 (step 744).

If signal S1 indicates a cache miss on channel 1, and signal S3 indicates a cache miss on channel 3 (step 750), circuit 640 tests the bit R1 for index I1 (step 754). If R1=0, the replacement set for channel 1 is set 0. Under the control of circuit 640, tag T1 is written to memory 610.0 at address I1 (step 760).

In parallel with step 760, step 714 is performed to update the attributes as described above.

If R1=1 at step 754, tag T1 is written to set 1 (step 764). Step 724 is performed in parallel.

If there was no cache miss on channel 3, that is, V3 was deasserted or V3 was asserted and a cache hit occurred on channel 3, circuit 640 tests the bit R0 (step 770) for index I1. If R0=0, control passes to step 754, and the operation proceeds as described above. If R0=1, R2 is tested (step 774). If R2=0, set 2 is the replacement set (step 780). Tag T1 is written to set 2, and step 734 is performed in parallel. If R2=1, set 3 is the replacement set (step 784). Tag T1 is written to set 3, and step 744 is performed in parallel.

If V3 is asserted, and either V1 is deasserted or I1 and I3 do not coincide, the operation of circuit 640 for channel 3 is similar to that illustrated in FIG. 7. However, if cache misses occur on both channels, then step 754 is not performed for index I3. Instead, R2 is tested at step 774. If R2=0, steps 780 and 734 are performed for index I3. If R2=1, steps 784 and 744 are performed. Similarly to FIG. 7, step 754 is performed for index I3 if there is no cache miss on channel 1 and R0=0 for index I3.

If both V1 and V3 are asserted, the tag write operations for channels 1 and 3 are performed in parallel. The attributes in memory 650 are also updated in parallel.

If both V1 and V3 are asserted, the indices I1 and I3 coincide, but the tags T1 and T3 are different, circuit 640 operates as follows. If cache hits occur on both channels 1 and 3, circuit 640 generates new values for attributes R0, R1, R2 for index I1=I3 in accordance with Table 1 below. The first column of Table 1 shows the sets in which the hits occur. Thus, in the first line, both hits are in set 0. The new attribute values are R0=1, R1=1, R2=—>. The next line indicates the new attributes when the cache hits are in sets 0 and 1, and so on. "*" means "don't care". The new attributes are written to one of the write ports of memory 650.

TABLE 1

| Sets hit | New attrs. | | |
|---|---|---|---|
| | R0 | R1 | R2 |
| 0 | 1 | 1 | -> |
| 0, 1 | 1 | * | -> |
| 0, 2 | * | 1 | 1 |
| 0, 3 | * | 1 | 0 |
| 1 | 1 | 0 | -> |
| 1, 2 | * | 0 | 1 |
| 1, 3 | * | 0 | 0 |
| 2 | 0 | -> | 1 |
| 2, 3 | 0 | -> | * |
| 3 | 0 | -> | 0 |

Table 2 shows the operation of circuit 640 when the indices I1 and I3 coincide, a hit occurs on one of channels 1 and 3 and, simultaneously, a miss occurs on the other one of channels 1 and 3. The first column shows the set in which the hit occurred. The third column shows the replacement set for the channel on which a miss occurred. The next two columns show the new values for attributes R1, R2 for the index I1. R0 is "don't care".

The second column shows the attribute tested to determine the replacement set and also to determine the new attribute values. For example, if the hit occurred in set 0, R2 is tested. If R2=0, the replacement set is set 2, and the new attribute values are R0=* ("don't care"), R1=1, R2=1. If R2=1, the replacement set is 3, and the new attributes are R0=*, R1=1, R2=0. The new attributes are written to one of the ports of memory 650.

TABLE 2

| Set hit | Old attr. | Rep. set | R1 | R2 |
|---|---|---|---|---|
| 0 | R2 = 0 | 2 | 1 | 1 |
|   | R2 = 1 | 3 | 1 | 0 |
| 1 | R2 = 0 | 2 | 0 | 1 |
|   | R2 = 1 | 3 | 0 | 0 |
| 2 | R1 = 0 | 0 | 1 | 1 |
|   | R1 = 1 | 1 | 0 | 1 |
| 3 | R1 = 0 | 0 | 1 | 0 |
|   | R1 = 1 | 1 | 0 | 0 |

Table 3 illustrates the operation when cache misses occur on both ports, I1=I3, and T1 is not equal to T3. The replacement sets and the new attribute values depend on the values of attributes R1, R2 listed in the first two columns of Table 3. The third column shows the replacement sets. The first replacement set is for channel 1. This set is determined by attribute R1. The second replacement set, for channel 3, is determined by attribute R2. The new attributes R1, R2 are shown in the last two columns. R0 is "don't care". The new attributes are written to one of the write ports of memory 650.

TABLE 3

| Old attrs | | Rep. sets | New attrs | |
|---|---|---|---|---|
| R1 | R2 | | R1 | R2 |
| 0 | 0 | 0, 2 | 1 | 1 |
| 0 | 1 | 0, 3 | 1 | 0 |
| 1 | 0 | 1, 2 | 0 | 1 |
| 1 | 1 | 1, 3 | 0 | 0 |

Figure 8:
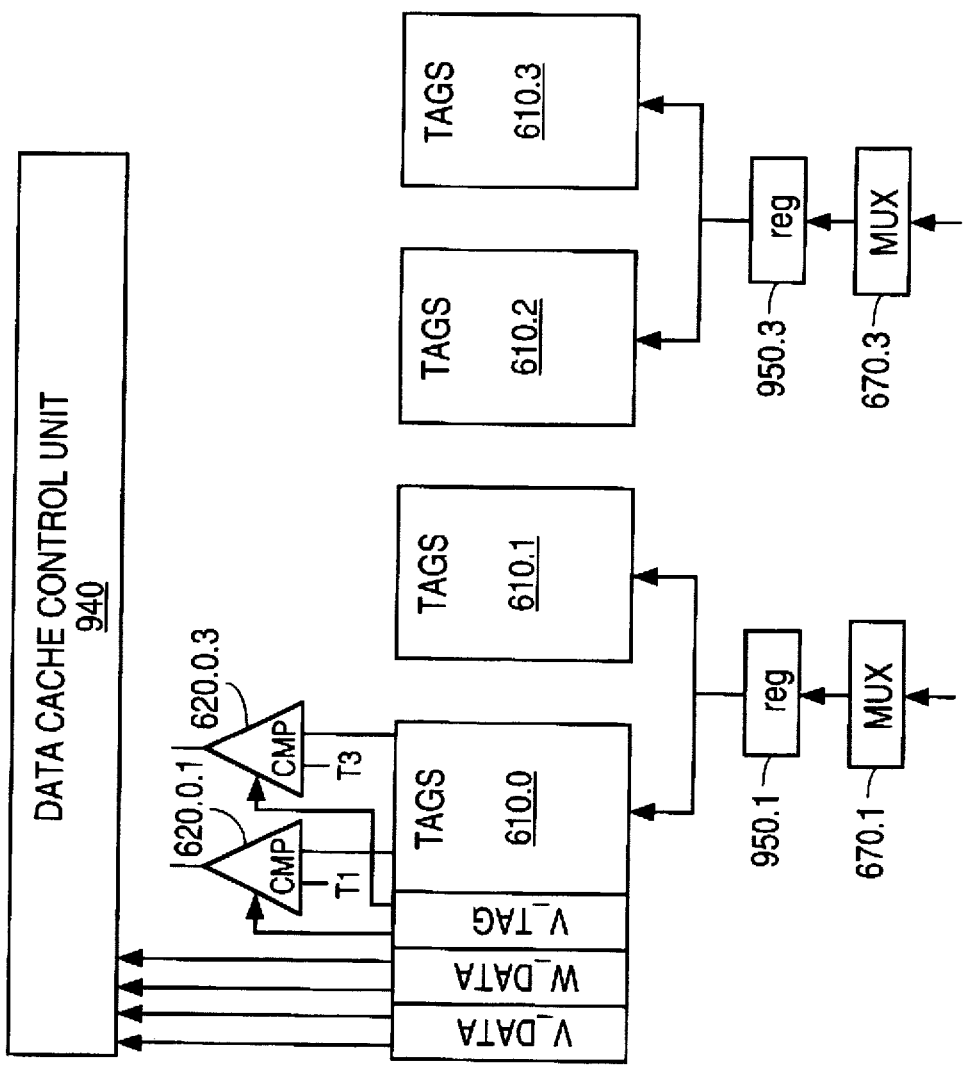
FIGS. 8 and 9 are block diagrams of portions of the cache of FIG. 5.

FIGS. 8 and 9 show other details of cache 110 of FIG. 5. Cache 110 is a write-through 32 Kbyte cache with 128 entries. Each data block 220 (FIG. 2) is 64 bytes wide. Each data port D1, D3, CD1, CD3 and MD0 through MD3 (FIG. 5) is 64 bits wide. The word size is 32 bits. The cache access time is one clock cycle.

Each tag 210 (FIG. 3) includes: 1) bits [47:13] of the virtual address, and 2) context bits [11:0]. Index 310 includes bits [12:6] of the virtual address. Block offset 320 includes bits [5:0] of the virtual address. Bits [5:3] define the double word being accessed. Bits [2:0] define a byte in the double word.

FIG. 9 illustrates data memories 910.0 through 910.3 that hold data blocks 220. Each memory 910.i holds data for the respective set 120.i.

Each memory 910.i is divided into four sections as shown by vertical lines in FIG. 9. The four sections correspond to four respective channels MD0-MD3. Each section has a separate write port. Four sections can be written from four respective channels MD0-MD3 in parallel.

Each section holds two double words of each block 220 in the respective set. For each block 220, its eight double words 0 through 7 are arranged as shown for memory 910.0. More particularly, double words 0 and 4 are in section 0, double words 1 and 5 are in section 1, double words 2 and 6 are in section 2, and double words 3 and 7 are in section 3. The section is identified by bits [4:3] of the virtual address.

The 64-bit data inputs of the write ports of sections 0 of all memories 910.i are connected to the output of register 920.0. Similarly, the data inputs of the write ports of all sections 1 are connected to the output of register 920.1. The data inputs of the write ports of all sections 2 are connected to the output of register 920.2. The data inputs of the write ports of all sections 3 are connected to the output of register 920.3. Each register 920.i is 64 bits wide. The input of each register 920.i is connected to the output of respective multiplexer 930.i. Each multiplexer 930.i has three data inputs connected respectively to: 1) port D1 of IEU 530, 2) port D3 of IEU 530, and 3) port MDi of external memory 550 (FIG. 5).

Multiplexers 930.i are controlled by data cache control unit 940 (FIG. 8). Unit 940 includes circuits 640, 630.1, 630.3, 632.1, 632.3, 634.1, 634.3 (FIG. 6). Four different sections 0, 1, 2, 3 can be written simultaneously from registers 920.i. The four sections can be in the same memory 910.i or in different memories. When a memory 910 is accessed, index 310 and block offset 320 are supplied to the memory's address input. Unit 940 provides a separate write strobe for each section. One, two, three or four sections can be written at a time.

Loading data from external memory 550 to memories 910 is called a reload operation. Data are reloaded not necessarily in the order in which the data words appear in memory 550. In particular, if a reload was caused by a load operation, then the data requested by the load are reloaded first. If the requested data are not at the beginning of block 220, the data at the beginning of block 220 can be loaded later.

For each set 120.i, cache 110 includes also the following memories. These memories are shown in FIG. 8 for set 120.0 only:

1) V_TAG includes a tag validity bit for each tag in the respective set 120.i. The V_TAG memory has two read ports and two write ports. One read port and one write port are provided for each of channels 1 and 3.

2) V_DATA has 8 bits [0:7] for each data block 220 in the respective set. Each of the 8 bits indicates whether a respective double word in the data block is valid. V_DATA has three read ports and three write ports. One read port and one write port are provided for each of channels 1 and 3. In addition, a read port is provided for a reload operation to check if data has been already updated by a store issued after the reload request. If data has been updated before the cache is reloaded, the reload of the respective double word is aborted. Also, a write port is provided to set V_DATA bits in a reload operation.

3) W_DATA ("wait data") has a bit for each data block in the set to indicate if the entire data block 220 has been written in a reload operation. The W_DATA memory has two read ports and six write ports. One read port and one write port are provided for each of channels 1 and 3. In addition, four write ports are provided for the four channels MD0 through MD3 in order to reset the W_DATA attributes at the end of a reload operation since in a reload the last double word of the block may come from any memory channel.

The outputs of memories V_DATA and W_DATA are connected to unit 940.

The channel-1 output of memory V_TAG of each set 120.i is connected to respective comparator 620.i.1. The channel-3 output of V_TAG is connected to respective comparator 620.i.3. If a V_TAG output shows an invalid tag, the output of the respective comparator indicates that the comparator inputs do not match.

FIG. 8 shows registers 950.1, 950.3 omitted for simplicity from FIG. 6. In FIG. 8, multiplexer 670.1 is a combination of multiplexers 670L1, 670T.1 of FIG. 6B. Multiplexer 670.3 is a combination of multiplexers 670L3, 670T.3 of FIG. 6B. The outputs of multiplexers 670.1, 670.3 are connected to respective registers 950.1, 950.3. The output of register 950.1 is connected to memories 610.0, 610.1. The output of register 950.3 is connected to memories 610.2, 610.3.

All registers 950.i, 920.j (FIG. 9) are clocked by the same clock.

Each memory 910.i has two read ports for respective channels 1 and 3. Both read ports can be read simultaneously. The outputs of the channel-1 read ports of memories 910.i are connected to the respective four data inputs of multiplexer 960.1. The channel-3 outputs are connected to respective data inputs of multiplexer 960.3. The select inputs of multiplexers 960.1, 960.3 are connected to respective outputs S1, S3 of comparators 620.i.j (FIG. 6B). The output of multiplexer 960.1 is connected to input CD1 of IEU 530. The output of multiplexer 960.3 is connected to input CD3 of IEU 530. The data on channels 1 and 3 can be provided by memories 910 simultaneously.

When cache 110 needs to issue a request to access external memory 550 (to perform a memory store or a reload), unit 940 asserts signals on output RQ1 (FIG. 5) for channel 1 or output RQ3 for channel 3. If cache misses occurred on channels 1 and 3 simultaneously, the requests to access memory 550 are issued on outputs RQ1, RQ3 (i.e., on channels 1 and 3) simultaneously if they relate to different data blocks. If both cache misses are in the same data block, one request for a data block is issued to memory 550 on one of channels 1 and 3, using the respective one of outputs RQ1, RQ3. In response, memory 550 returns the double word in which one of the cache misses occurred. This double word is loaded into cache 110 and register file RF. The other 7 double words are returned at the same time or later. In parallel with the data block request on one of channels 1 and 3, the other one of channels 1 and 3 is used to request the double word in which the other cache miss occurred. The double word for the other cache miss is loaded into the register file RF (FIG. 10) in IEU 530. The parallel requests on channels 1 and 3 facilitate making the cache non-blocking and serve to increase the processor performance in non-blocking cache embodiments. In non-blocking embodiments, a cache miss on channel 1 or 3 does not prevent a concurrent cache access on the other one of channels 1 and 3; also, if a cache miss occurs on channel 1 or 3, succeeding accesses to the cache on the same channel are not blocked; these accesses can proceed while data are reloaded in response to the cache miss.

Unit 940 also receives a memory response for channels MD0–MD3. The memory response includes the index and the set number for the cache 110. The index and the set number are sent to memory 550 with a memory request. The index and the set number are returned by memory 550 with the data.

If a cache reload is caused by a load operation, the corresponding tag valid bit V_TAG and wait data bit W_DATA are set to 1, and the data valid bits V_DATA [0:7] are set to 0 for the corresponding data block. External interface 540 sends to memory 550 a request for 8 words, a DCACHE data field flag (this flag means a request for a block of 8 words for cache 110), the respective index I1 or I3, and the replacement set number (0, 1, 2, or 3). As data come from memory 550, the corresponding V_DATA bits are set to 1. The data can be read from cache 110 as soon as they are written from memory 550, before the entire block is written. When the whole block is written, the corresponding W_DATA bit is set to 0. If a load operation gets a cache hit but the corresponding V_DATA bit is 0, a request for one double word goes to memory 550.

In a memory store operation, a byte, a half word, a word or a double word is written to memory 550 and, in case of a cache hit, to cache 110. In a double word store, the double word and the tag are also written to cache 110 in case of a cache miss. The corresponding bits V_TAG, W_DATA and V_DATA are set to 1. The remaining seven V_DATA bits are set to 0. A request for seven words is issued to memory 550.

If store operations are performed simultaneously on channels 1 and 3, and they hit the same section or they hit sections having the same section number, then the cache data corresponding to one of the two store operations is invalidated. Invalidations are performed by resetting the corresponding bits in the V_DATA memory.

A data block can be replaced only if its W_DATA is 0. The replacement block is selected from the blocks having W_DATA=0. If such a block is not found, the data are not cached.

Processor 520 includes a memory management unit (MMU) which includes a 4-port data translate look-aside buffer (DTLB) to speed up virtual-to-physical address translation. TLBs are known in the art. See, for example, B. Catanzaro, "Multiprocessor System Architectures" (Sun Microsystems, Inc. 1994) hereby incorporated herein by reference, at page 96. Unit 940 receives MMU signals for channels 1 and 3. In addition, unit 940 receives the following signals for channels 1 and 3:

1) TLB_hit indicating whether DTLB was hit during the channel access.

2) CACHEABLE indicates whether the channel data can be cached.

3) GLOBAL—If this flag is set, the context fields in tag memories 610 and in virtual addresses VA1, VA3 are ignored during the tag search.

4) VECTOR indicates whether the channel data are vector or scalar. Cache 110 is used only for scalar data.

If cache 110 is hit and the DTLB is missed, the cache location is invalidated.

Two or more virtual addresses can be mapped to the same physical address. This is called aliasing. To maintain cache consistency, page table entries contain an alias attribute which shows if the virtual page has an alias. DTLB entries have an alias mark showing if the corresponding pages have an alias. If virtual pages are aliases of one another, their data are cached in the same set. Of note, index 310 (FIG. 3) is a subset of a page offset. Therefore, data from a given physical location in a page that has aliases is always cached in the same location in cache 110.

When an alias is created and an alias attribute is turned on in a page table, software is responsible for flushing cache 110.

While the invention was illustrated with respect to the embodiments described above, the invention is not limited by these embodiments. In particular, the invention is not limited by the type of information cached in the cache. Some cache embodiments store both instructions and data, or only instructions. Vector data are cached in some cache embodiments. In some embodiments, the cache is accessed using physical rather than virtual addresses. In some embodiments, the cache is fully associative—data can be cached in any cache entry. The invention is not limited to write-through caches or to LRU type replacement policies. Other embodiments and variations are within the scope of the invention, as defined by the appended claims.

APPENDIX

Figure 10:
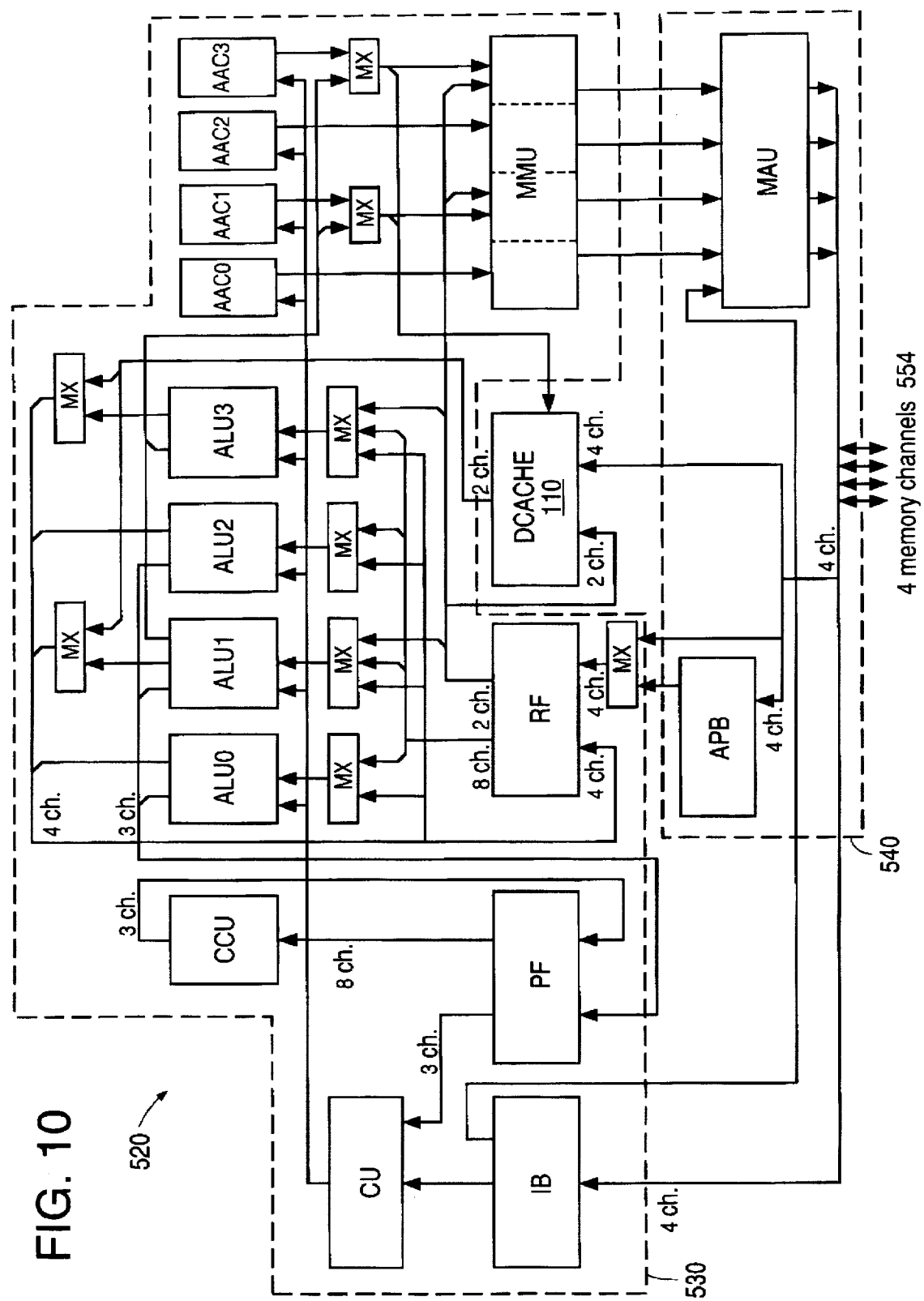
FIG. 10 is a block diagram of a processor including a cache of the present invention.

VLIW CPU 520 of FIG. 10 uses Instruction Level Parallelism (ILP) to ensure high performance. The compiler can plan CPU work in each cycle. CPU 520 can execute concurrently a few simple independent instructions (operations) that constitute a wide instruction (load, store, add, multiply, divide, shift, logical, branch, etc.). Wide instructions are stored in memory and in an instruction cache (ICACHE) in packed form as sets of 16 and 32 bit syllables. An operation can occupy a part of syllable, a whole syllable, or several syllables.

CPU 520 contains an Instruction Buffer (IB), a Control Unit (CU), a multiport Predicate File (PF), a multiport Register File (RF), a Calculate Condition Unit (CCU), a Data Cache 110 (DCACHE), four Arithmetic Logic Units (ALU0–ALU3), an Array Prefetch Buffer (APB), four Array Access Channels (AAC0–AAC3), a Memory Management Unit (MMU) and a Memory Access Unit (MAU).

The Instruction Buffer (IB) contains 2048 64-bit double words and is divided into 16 sectors. Program code and data are accessed using virtual memory. IB has a separate Instruction Translate Lookaside Buffer (ITLB) with 32 entries. IB filling is initiated by hardware for sequential instruction flow when sequential instructions are exhausted in IB and by a program when a prepare control transfer operation is executed. IB performs program code filling for three branches. In the case of an IB miss the program code is loaded from memory by 4 memory access channels in parallel (4 64-bit double words simultaneously). Control Unit (CU) reads from IB and dispatches one maximum size wide instruction (8 64-bit double words) every cycle.

The Control Unit generates an unpacked form of a wide instruction, converts indirect based operand addresses for a wide instruction to absolute register file addresses, and checks the following conditions for wide instruction:

no exceptions, no interlock conditions from other units of CPU, operands availability in RF.

CU issues wide instruction's operations for execution and performs the following:

reads up to 10 operands from RF to ALU0–ALU3, reads up to 3 predicate values from PF to CU as condition code for control transfer operations, reads up to 8 predicate values from PF to CCU for new predicate values calculation and generation of a mask of conditional execution of operations in ALU0–ALU3 and AAC0–AAC3, issues literal values to ALU0–ALU3 and AAC0–AAC3, issues up to 4 operations to ALU0–ALU3, issues up to 4 operations to AAC0–AAC3, issues up to 11 operations to CCU, issues a prepare control transfer operation to CU, checks the possibility of the execution of three control transfer operations in CU.

The Predicate File (PF) is a storage of predicate values generated by integer and floating point compare operations. Predicate values are used to control the conditional execution of operations. The Predicate File contains 32 two-bit registers.

The Calculate Condition Unit (CCU) generates a mask for the conditional execution of ALUi and AACi operations and calculates values of the secondary predicate as a function of the primary predicates.

The Register File (RF) contains 256 66-bit registers and has 10 read ports and 8 write ports. All 10 read ports are used to read ALU operands and 2 read ports are used to read values to DCACHE 110 and MMU when these values are being written to memory. 4 write ports are used to write ALU results and other 4 write ports are used to write values loaded from memory.

ALU0-ALU3 are 4 parallel execution channels and have almost the same sets of arithmetic and logic operations. In addition, ALU1 and ALU3 are used to calculate addresses for scalar memory accesses. All ALUs get their operands from RF and via a bypass. The bypass reduces the time of delivery of ALU operation results to subsequent operations. ALU0 and ALU2 get 2 operands and ALU1 and ALU3 get 3 operands because they can execute combined 3-argument operations. ALU operation results are written to RF through 4 RF write channels.

The Array Access Channels AAC0-AAC3 are 4 parallel channels for generation of array element address for loops. Each AACi contains 8 pairs of address registers. Each pair includes a current address register and an increment register. All AACi have the same operation set: the current array element address generation (with or without the next element address calculation). For memory accesses, one pair of address registers in each channel is used in every cycle. AAC0 and AAC2 are used only for load memory accesses. AAC1 and AAC3 are used for load and store memory accesses.

The Memory Management Unit contains 4-port Data Translate Lookaside Buffer (DTLB) with 64 entries and performs hardware searches in a Page Table in DTLB miss cases. In addition, MMU contains Disambiguation Memory for checking latencies of load and store operations.

The Memory Access Unit contains an entry buffer for memory requests and a cross bar of 4 data and 1 group IB memory access channels to 4 physical memory channels. 2 least significant bits of physical addresses are the physical memory channel number.

The DCACHE 110 output is combined with the ALU output. This permits to use bypass to reduce data transfer to ALUs.

The Array Prefetch Buffer is used to prefetch array elements for loops from memory. APB is a 4-channel FIFO buffer. APB contains 4×48 66-bit registers. Data are transferred from APB to RF when ready.

CPU 520 has 4 memory access channels. Each channel has a 64 bit data path.

"MX" means a multiplexer.

We claim:

1. A multi-port cache system comprising:
   a plurality of sets, each set comprising a memory for caching one or more units of information;
   a memory for storing one or more data trees for selecting, from the sets, replacement sets in which units of information are to be cached, wherein each leaf node in each tree corresponds to a group of one or more of the sets, and each leaf node is for selecting a replacement set in the corresponding group of the sets, wherein each tree is suitable for being searched from any node to a leaf node to select a replacement set, each non-leaf node to specify its child node to which the search is to proceed;
   a plurality of ports for accessing the cache; and
   a circuit for determining a number U1 of new units of information that are to be cached in response to cache misses occurring simultaneously on one or more of the ports, and for searching one or more of the trees for at least N1 replacement sets to cache the U1 units of information, wherein N1>0, and wherein if U1>1 then N1>1 and the circuit starts a search for each of N1 replacement sets from a separate one of the tree nodes.

2. The cache system of claim 1 wherein each group of sets comprises at least one write port to write to one or more sets of the group, wherein writing to different write ports can proceed simultaneously.

3. The cache system of claim 1 wherein each set comprises a write port, and writing to different sets through their respective write ports can proceed simultaneously.

4. The cache system of claim 1 wherein the groups corresponding to different leaf nodes of any one of the trees do not intersect.

5. The cache system of claim 1 wherein N1=U1 and the number of ports does not exceed the number of leaf nodes in any one of the trees.

6. The cache system of claim 1 wherein each set comprises a plurality of slots, each slot for storing a block of information, wherein all the slots having the same address in all the sets form an entry, and the one or more trees comprise a separate data tree for each entry.

7. The cache system of claim 6 wherein:
   in each data tree, each leaf node is to select the least recently used slot in the corresponding entry; and
   each non-leaf node corresponds to a group of sets which are all the sets in all the groups corresponding to all leaf children of the non-leaf node, and the non-leaf node defines a group of slots which are all the slots in the corresponding group of sets in the corresponding entry, and each non-leaf node is to specify its immediate child node defining the least recently used group of slots among all the groups defined by the immediate children of the non-leaf node.

8. A computer system comprising the cache of claim 1 and one or more instruction execution channels, wherein each execution channel is connected to a separate one of the ports for accessing the cache.

9. A method for providing a multi-port cache system, the method comprising:
   providing a plurality of sets, each set comprising a memory for caching one or more units of information;
   providing a memory for storing one or more data trees for selecting, from the sets, replacement sets in which units of information are to be cached, wherein each leaf node in each tree corresponds to a group of one or more of the sets, and each leaf node is for selecting a replacement set in the corresponding group of the sets, wherein each tree is suitable for being searched from any node to a leaf node to select a replacement set, each non-leaf node to specify its child node to which the search is to proceed;
   providing a plurality of ports for accessing the cache; and
   providing a circuit for determining a number U1 of new units of information that are to be cached in response to cache misses occurring simultaneously on one or more of the ports, and for searching one or more of the trees for at least N1 replacement sets to cache the U1 units of information, wherein N1>0, and wherein if U1>1 then N1>1 and the circuit starts a search for each of N1 replacement sets from a separate one of the tree nodes.

10. A method for caching information in a multi-port cache comprising a plurality of sets stored in a memory, the method comprising:

selecting M nodes in one or more tree data structures stored in a memory, where M is a number of cache misses that occurred simultaneously;

for each selected node, searching a tree of children of the selected node to determine a leaf node;

for each leaf node determined as a result of a search, using a set selected by the leaf node as a replacement set for a respective cache miss.

11. The method of claim 10 wherein M>1 and the method further comprises simultaneous writing to the replacement sets to update the cache.

12. The method of claim 11 wherein each set comprises a write port, and simultaneous writing to the replacement sets proceeds through a plurality of the write ports of the replacement sets.

13. The method of claim 10 wherein each set comprises a tag memory comprising a single write port, and simultaneous writing to the replacement sets comprises simultaneous writing of tags through a plurality of the write ports of the tag memories.

* * * * *